Feb. 22, 1966 G. KLEIN 3,237,113

PERIODIC SIGNAL APPARATUS

Filed March 9, 1959 2 Sheets-Sheet 1

INVENTOR
GERRIT KLEIN

BY
Frank R. Jifari
AGENT

Feb. 22, 1966 G. KLEIN 3,237,113

PERIODIC SIGNAL APPARATUS

Filed March 9, 1959 2 Sheets-Sheet 2

INVENTOR
GERRIT KLEIN

BY Frank R. Jifari
AGENT

United States Patent Office 3,237,113

Patented Feb. 22, 1966

3,237,113
PERIODIC SIGNAL APPARATUS

Gerrit Klein, Eindhoven, Netherlands, assignor to North American Philips Company, Inc., New York, N.Y., a corporation of Delaware Filed Mar. 9, 1959, Ser. No. 798,020
Claims priority, application Netherlands, Apr. 26, 1958, 227,302
9 Claims. (Cl. 328—142)

This invention relates to periodic signal apparatus and, in particular, to apparatus for producing output signals which vary according to predetermined functions of an input signal. More particularly, the invention provides such an arrangement which is suitable for use in measuring apparatus and analogue computers.

In certain measuring systems, for example, for acoustical measurements, it may be desirable for the voltage or current providing the indication to vary directly as the logarithm of an input voltage taken from a transducer. In order to approximate this variation, it is known to use circuit arrangements including non-linear elements, such as pentode amplifiers, circuit arrangements using dry rectifiers or triodes adjusted to a certain point of their characteristics, and so on.

It is an object of the present invention to provide an arrangement of the kind described by means of which, with variations of the input voltage within wide limits, an output voltage is obtained which is related to the input voltage according to a function chosen comparatively at random.

The invention essentially comprises a difference amplifier having a pair of input electrodes, one of which is supplied with a first voltage and the second being supplied with a periodic voltage varying as a predetermined function of time. The output voltage of the difference amplifier may be supplied to an integrating network. By proper choice of the input signal waveforms and the circuit parameters, various output waveforms are obtainable which may be rather intricately related to input waveforms of relatively simple time functions.

The term "difference amplifier," as used herein, is to be understood to mean an arrangement which has two input terminals and wherein only the difference between the voltages at the input terminals is amplified. In its simplest form, a difference amplifier comprises two discharge systems, for example, electron tubes, to the interconnected cathodes of which a fixed voltage is applied through a common resistor, while the anodes are fed through separate resistors. The input terminals are connected to the control electrodes. The use of a large cathode resistor prevents excessive variations of the total current flowing through the two systems. Only the tube whose control electrode is at the higher potential will pass current. Preferably, the difference amplifier comprises at least two identical stages in order to satisfy the requirement that only the output tube to which the higher input voltage is applied, passes current. Provision may be made of two output terminals which are connected to the anodes of the tubes of the final stage. This ensures that each of the output tubes can have only two conditions: the tube either passes a constant current or it is cut off. The output voltage can be taken from the anode of either output tube or between the two anodes. The output voltage then comprises a sequence of square wave pulses.

Thus, a difference amplifier can indicate which of two points is at the higher voltage. This is effected irrespective of the voltage level at which the two points are connected to one another.

The arrangement, in accordance with the invention, can be such that the frequency of the periodic voltage is kept constant, in which event the duration of each output pulse depends upon the value of the first-mentioned input voltage. In this case, the amplitude of the periodic input voltage must exceed the highest value of the first voltage. Thus, after integration, a voltage is obtained which is related to the first-mentioned voltage according to a function which is inverse to the time function of the periodic voltage.

Alternatively, the frequency of the periodic voltage may be made to depend upon the first-mentioned voltage by designing the arrangement so that the periodic voltage wave beings a new cycle at the instant at which the two voltages become equal. In this embodiment, care must be taken to ensure that a pulse of constant amplitude and duration is produced so that the integrated voltage is reciprocal to the inverse function of the periodic voltage function. The pulse is produced by means of a known circuit arrangement comprising amplifier systems.

Furthermore, in the first case the pulse height, and in the second case the pulse height and/or the pulse duration, may be made to vary according to a given time function so that a different dependence can be obtained.

In this manner, various functions can be generated which would be extremely difficult to obtain by conventional techniques. Applications of these functions may lie in the field of analogue computers.

Other objects and advantages of the invention will be apparent from the following specification and the accompanying drawings in which.

FIGS. 3*a*–3*d*, 4*a*, 4*b*, 5*a*, 5*b*, 7*a*, 7*b* and 8*a*–8*c* illustrate some of the various waveforms obtainable with the apparatus of the invention.

Figure 6:
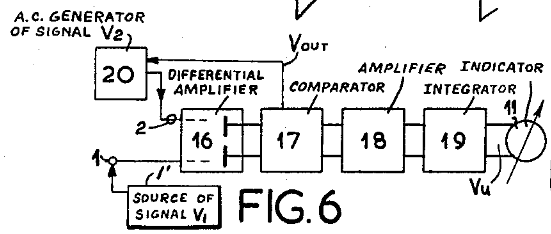

FIG. 6 is a block diagram of another form of the invention.

Figures 9, 10, 11:
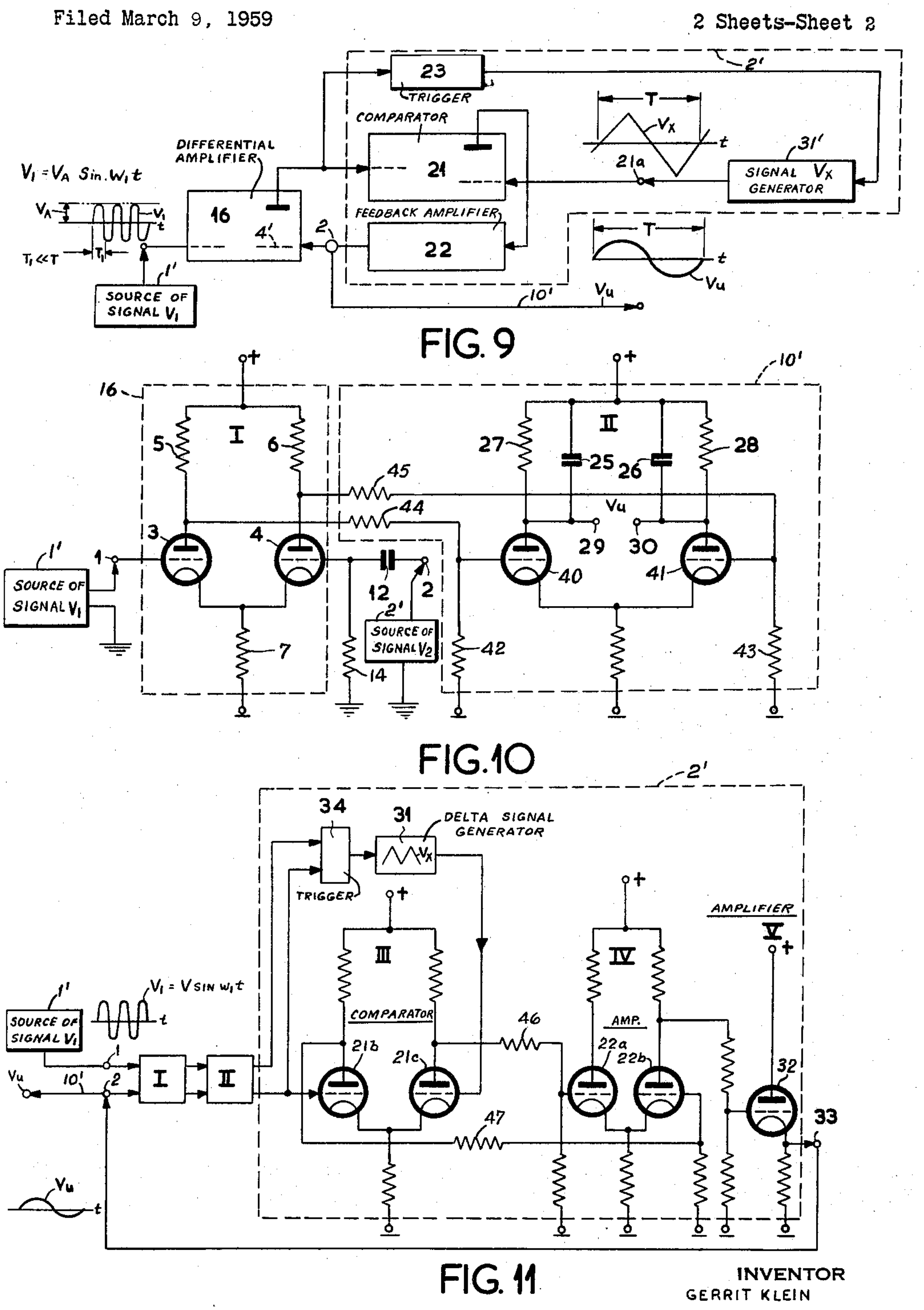

FIG. 9 is a block diagram of still another form of the invention for generating sinusoidal voltages of extremely low frequency.

Figures 1, 2:
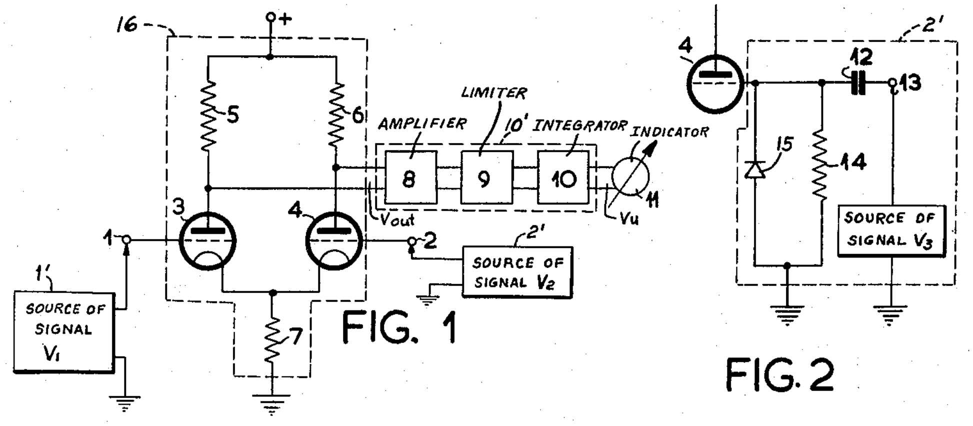
FIG. 1 is a diagram of a basic form of the invention for generating various waveforms.
FIG. 2 shows a modification of the apparatus of FIG. 1 for obtaining a logarithmic output voltage.

FIG. 10 is a schematic diagram illustrating further details of the apparatus of FIG. 1.

FIG. 11 is a diagram showing further details of the apparatus of FIG. 9.

FIG. 1 shows a difference amplifier 16 in its simplest form, comprising input terminals 1 and 2, tubes 3 and 4, anode resistors 5 and 6 and a cathode resistor 7. If at the input electrode 1, a voltage $V_1$, provided by signal source 1', is supplied, and to the other input electrode 2 a voltage $V_2$, provided by signal source 2', is applied which periodically varies in a certain manner with time, the amplifier can provide a train of current pulses at its output. The duration of each output current pulse is equal to the time during which the voltage at one input terminal exceeds the voltage at the other terminal. This time depends upon the input voltage $V_1$, and is related thereto according to a function which is inverse to the function according to which the voltage $V_2$, applied to terminal 2, varies with time. Hence, by a proper choice of the waveform of voltage $V_2$ at the terminal 2, an output voltage $V_u$ is obtainable which varies in a certain desired manner. The output current pulses $I_{out}$ are amplified in an amplifier device 8, then limited in a limiter device 9 and integrated in an integrator device 10. This is a conventional smoothing device. At its output terminals, a direct voltage $V_u$ is produced which is indicated by a measuring indicator or recording instrument 11, and is related to the voltage at the terminal 1 according to a desired function.

When the voltage $V_2$ at the terminal 2 is a periodic time function, $V_2=f(t)$, the relation between the output voltage $V_u$ and the voltage $V_1$ at the terminal 1 is given by the function inverse thereto, i.e., $V_u=f_{inv}(V_1)$.

A logarithmic direct-voltage meter can be obtained by applying to the terminal 2 a periodic voltage $V_2$ which periodically varies according to a decreasing exponential function, i.e., $$V_2=f\left(e-\frac{t}{k}\right)$$

Figures 3A, 3B, 3C, 3D:
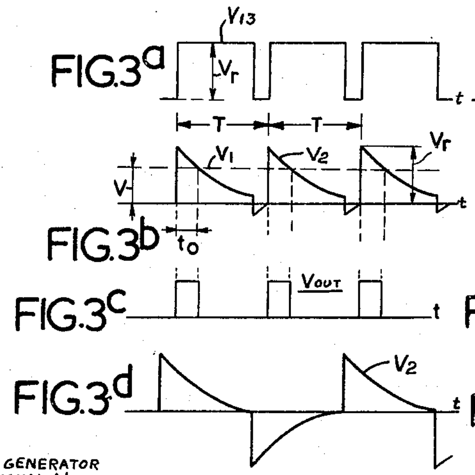

This can be achieved in the manner shown in FIG. 2, in which an input terminal 13 is connected, through a capacitor 12, to the control grid of the tube 4, this grid being grounded through a resistor 14. A square wave voltage $V_{13}$, FIG. 3*a*, is supplied by signal source 13' to terminal 13 at an amplitude $V_r$, slightly greater than the maximum voltage to be measured. The grid is also connected to ground through a rectifier 15, which effectively clamps the grid to ground against negative excursions of the input voltage $V_{13}$. If a square-wave voltage of amplitude $V_r$, of the kind shown in FIG. 3*a*, is applied to the input terminal 13, at the control grid of the tube 4 a periodic voltage $V_2$ is produced, of the shape shown in FIG. 3*b*.

The periodic voltage shown in FIG. 3*b* repetitively exceeds the amplitude V of the input voltage $V_1$, illustrated by way of example as a constant voltage represented therein by a horizontal dash line, for short periods of time $t_0$. Therefor, at the output terminals of the amplifier there is produced a sequence of square wave voltage pulses $V_{out}$, FIG. 3*c*, of constant amplitude. The duration $t_0$ of each pulse varies logarithmically with the amplitude V of the voltage $V_1$. When the output pulses are integrated, a voltage $V_u$ is produced which also varies directly as the natural logarithm of the voltage $V_1$ at the input terminal 1. It is assumed that this latter voltage is positive. In order to enable small voltages to be measured, the grid voltage at the end of each period during which the voltage at the input terminal is positive must be as small as is practically feasible.

The diode 15 may be omitted and both polarities of $V_1$ may be utilized for the voltage at the terminal 1, by using at terminal 13, a square-wave voltage $V_{13}$ in which the positive and negative periods are of equal duration. Voltage $V_{13}$, appropriately differentiated, is shown as voltage $V_2$ in FIG. 3*d*, wherein it is assumed that the discharge voltage of the capacitor 12, FIG. 2, is substantially zero. Neglecting a certain range of very low voltage, an output voltage $V_{out}$ can be obtained which through a wide range is proportional to the natural logarithm of the absolute value of the input voltage $V_1$. The polarity of the input voltage is indicated by the polarity of the output voltage, at least if the latter is taken between the two output terminals. The range of voltages in which a correct indication is unobtainable can be reduced by making the amplification sufficiently high.

A more detailed circuit diagram of an arrangement similar to FIG. 1 is shown in FIG. 10, in which roman numeral I designates a first difference amplifier stage and roman numeral II a second stage. As shown in FIG. 10, stage I comprises a differential amplifier similar to the amplifier 16 of FIG. 1 and has a signal source 1' coupled to its input terminal 1. A signal source 2' is coupled to the control electrode of the tube 4 via a suitable coupling circuit illustrated in FIG. 10 as a capacitor 12 and resistor 14. In parallel with anode resistors 27 and 28 of the second stage there are connected capacitors 25 and 26 which effect the integration of the square-wave voltages. The output voltage $V_u$ is taken from the anodes of the second stage, terminals 29 and 30. The values of corresponding elements in the first and second stages can be substantially equal. The grids of the tubes 40–41 of the second stage are connected through resistors 42–43, which may be controlled vacuum tubes, to a source of negative voltage, while the anodes of the tubes 3–4 of the first stage are connected through resistors 44–45 to the grids of the tubes 40–41 of the second stage, in order to adjust the latter to the correct rest voltage level.

Figures 4A, 4B, 5A, 5B:
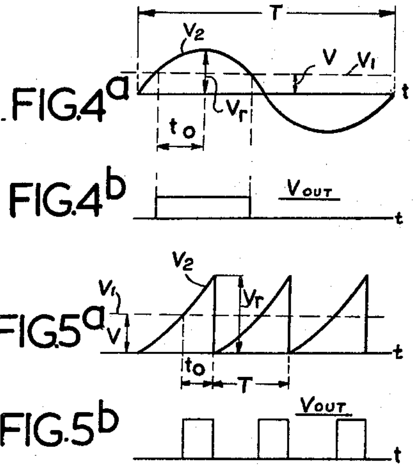

In a further embodiment of the invention, a truly sinusoidal alternating voltage $V_2$ can be applied to the terminal 2 of FIG. 1 so that an output voltage is obtained which is proportional to the inverse sine function. This is shown in FIG. 4*a*, in which the maximum value of the alternating voltage $V_2$ is designated $V_r$, and the voltage at the terminal 1 is denoted by $V_1$, having an amplitude V. For a certain period of time during each cycle, the alternating voltage $V_2$ exceeds the amplitude V of voltage $V_1$ and a pulse $V_{out}$ is produced at the output as shown in FIG. 4*b*. If T, FIG. 4*a*, is the duration of a cycle of alternating voltage $V_2$, and $t_0$ the time during the first quarter of a cycle for which the sinusoidal voltage $V_2$ exceeds the input voltage $V_1$, then $$t_0=\tfrac{1}{4}L-\frac{1}{\omega}\text{ arc sin }\frac{V}{V_r}$$

Consequently, the output voltage varies directly as arc sin $$\frac{V}{V_r}$$

If, on the other hand, the voltage $V_2$ comprises a saw-tooth voltage of constant frequency, having a leading edge which is linearly varying with time, obviously an output voltage is obtained which varies directly as the input voltage. Furthermore, if the alternating voltage $V_2$ comprises a voltage which periodically varies with the square of the time *t*, i.e., $V_2=kt^2$, then an output voltage is obtained which varies directly as the square root of the input voltage. This can be seen from FIGS. 5*a* and 5*b*. Here $$t_0=T\left(1-\sqrt{\frac{V}{V_r}}\right)$$

where T, FIG. 5*a*, is the period of the periodic voltage $V_2$. It is not difficult to see that, even if voltage $V_2$ is some other periodic function of time, this apparatus still produces an output signal which is the inverse function of $V_1$.

FIG. 6 shows in block-schematic form an arrangement operating upon the second principle, i.e., the frequency of the output pulses is a function of the input signal. The difference amplifier, which may be similar to that shown in FIG. 1, is designated 16. The output voltages are supplied to a comparator 17. Comparator 17 comprises means to compare the two input voltages thereof, and to generate a pulse of constant duration and amplitude at each instant at which one input voltage exceeds the other. This pulse is supplied to an amplifier-limiter 18. The pulse from comparator 17 is also supplied to an alternating voltage generator 20, these pulses terminating one cycle of the alternating voltage $V_2$ and initiating the next cycle. Thus, the frequency of the alternating voltage $V_2$ produced in the generator 20 varies, the variation depending upon the nature of the function according to which the alternating voltage $V_2$ varies with time during each period.

Accordingly, to the integrator 19 there is supplied a sequence of identical pulses $V_{out}$, the repetition frequency of which depends upon the said function of voltage $V_2$. After integration, the direct voltage $V_u$ obtained is read from an instrument 11, the indication of which thus depends upon the input voltage $V_1$ according to an accurately determined function. This latter function is the inverse reciprocal function of the time function of the input voltage $V_2$ at the second terminal.

Figures 7A, 7B:
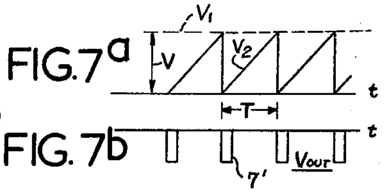

Let it be assumed that, as is shown in FIG. 7*a*, the alternating voltage $V_2$ produced by generator 20 is a saw-tooth voltage having a linearly ascending leading edge. As is shown in FIGS. 7*a*–7*b*, at the instant at which the amplitude of the saw-tooth voltage $V_2$ is equal to the amplitude of the voltage $V_1$ applied to terminal 1 of FIG. 6, a pulse, for example, pulse 7', is produced the duration and amplitude of which is constant. The frequency of the pulses $V_{out}$, FIG. 7*b*, varies inversely as the amplitude V of the input voltage $V_1$, while the output voltage $V_u$ indicated by the meter 11 varies directly as the pulse frequency. In this manner, functions can be obtained which are reciprocal to the inverse function of the function according to which the alternating voltage $V_2$ is varying with time.

If, as is shown in FIG. 7*a*, the generator 20 produces a saw-tooth voltage $V_2$ of varying frequency, having a period T which is dependent on the amplitude V of the input voltage $V_1$, and if the voltage $V_2$ at a certain instant T is given by $V=V_2=C_1.T$.

Hence, $T=V/C_1$ and the output voltage $$V_u=C_2/T=C_3/V$$

where $C_1$, $C_2$ and $C_3$ are proportionality factors.

Consequently, the output voltage varies directly as the inverse of the input voltage. Such an arrangement might be used for instantaneous frequency measurement.

If, for example, to the terminal 2 of FIG. 6, a voltage $V_2$ of the kind shown in FIG. 5*a* is applied, which during each cycle varies directly as the square of the time, and to terminal 1, a voltage $V_1$ of amplitude V is applied, the following relationships are obtained: $V_2=V_r=C_1T^2$ and $T^2=V_r/C_1$. From this is follows that the output voltage $V_u=C_2/\sqrt{V_r}$; where $C_1$ and $C_2$ are proportionality factors.

Thus, in this case, the output voltage varies inversely as the square root of the input voltage.

The input voltage $V_1$ supplied to the terminal 1, need not be a variable direct voltage. It may be an alternating voltage provided that the highest frequency included in this voltage is materially lower than the frequency of the auxiliary alternating voltage $V_2$ at the terminal 2. By choosing a sinusoidal alternating voltage as the voltage at the terminal 1, a triangular or delta-shaped output voltage can be obtained when using an arrangement as shown in FIG. 1. This is illustrated by the waveforms in FIG. 8.

Figures 8A, 8B, 8C:
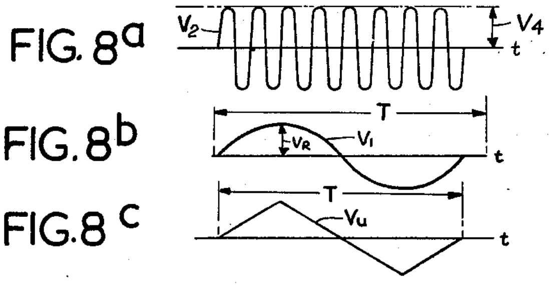

FIG. 8*a* shows the sinusoidal alternating voltage $V_2$ applied to the terminal 2, which has a relatively high frequency $\omega_2$ and an amplitude $V_4$; FIG. 8*b* shows the sinusoidal voltage $V_1$ applied to the terminal 1 having a low frequency $\omega_1$, which is a small fraction of the first-mentioned frequency $\omega_2$. If the input voltage at the terminal 1 of FIG. 1 is denoted by $V_1$, where $V_1=V_r \sin \omega_1 t$, the voltage at the output varies directly as arc sin $V_1$. Consequently, it varies directly as arc sin $\omega_1 t$. This means that at the output, a triangular voltage $V_u$, FIG. 8*c* is produced having a period T which is equal to that of the low-frequency voltage $V_1$. This only applies if the amplitudes of the two sinusoidal voltages are equal.

Alternatively, a delta voltage may be converted into a truly sinusoidal alternating voltage. It is comparatively simple to produce a triangular voltage having a period of the order of magnitude of from ten to ten thousand seconds. It is less simple to produce a sinusoidal voltage having such a period by known means. When using the arrangement shown diagrammatically in FIG. 9, which is based on the same principle as the arrangement shown in FIG. 1, sinusoidal alternating voltages having a period of, for example, a few hours or more can be produced by relatively simple means.

In the arrangement shown in FIG. 9, a sinusoidal alternating voltage $V_1=V_A \sin \omega_1 t$ having a comparatively high frequency $\omega_1$, is applied from a voltage source 1' to the input terminal 1 of a difference amplifier 16. The voltage appearing at the output of difference amplifier 16 is supplied via coupling means 16' to one input of a comparison device 21. To the other input terminal 21*a*, of comparator 21, a delta alternating voltage $V_x$ of very low frequency is supplied by signal generator 31'. One output terminal of the device 21 is connected, through a feedback amplifier 22, to the second input terminal 2 of the difference amplifier 16. The input of delta signal generator 31' is connected through a trigger device 23 to the output of the inverse-function generator, i.e., amplifier 16. The trigger arrangement ensures that the amplitude of the delta voltage has the correct value. At the grid 4' of the second tube of the difference amplifier 16, a truly sinusoidal voltage is produced the frequency of which is equal to the frequency of the delta voltage, while its amplitude is equal to the amplitude of the high-frequency voltage.

FIG. 11 shows a more elaborate circuit diagram of the sinusoidal generator of FIG. 9. The inverse-function generator comprising two stages, I and II, corresponds in function to the differential amplifier 16 of FIG. 9 and may be designed as shown in FIG. 10, with the exception that now there is applied to the terminal 1, by means of signal source 1', a sinusoidal alternating voltage the frequency of which can be of the order of magnitude of 5000 c./s., and that the terminal 2 is now connected to a feedback circuit. Stage I, via one output of the stage II, is connected to one input of a comparison device III, i.e. the control grid of triode 21*b*. The other input of comparison device III, i.e. the control grid of triode 21*c* is connected to a voltage generator 31 of triangular or delta wave shape similar in function to signal generator 31' of FIG. 9. The comparison device III is combined with an amplifier IV comprising triode tubes 22*a* and 22*b*, the output voltage of which is supplied to a matching amplifier V. The two stages III and IV each contain two tubes connected as in the difference amplifier. The output of comparison stage III is coupled to the control grids of tubes 22*a* and 22*b* by means of resistors 46 and 47, respectively. The second stage IV acts exclusively as an amplifier. The feedback signal is coupled from the anode of tube 22*b* to the grid of cathode follower 32. The output signal, via terminal 33 of the amplifier V, is fed back to the input terminal 2. This negative feedback causes the input voltage at the point 2 to vary so that at the output of stage II, a delta voltage is produced which follows the low-frequency delta voltage produced in the device 31. This means that at the input terminal 2 a sinusoidal voltage $V_u$ is derived having the frequency of the delta voltage.

There is an additional complication in that with a voltage V sin $\omega_1 t$ at the input terminal 1, and with the sinusoidal voltage $V_u$ at the terminal 2 having the same amplitude, there is associated a delta voltage at the input of the stage III having an accurately determined amplitude. Hence, care must be taken that this latter voltage really follows a delta voltage having the amplitude which is generated by the generator 31. For this reason, use is made of a trigger circuit arrangement 34, similar in function to trigger device 23 of FIG. 9, which at the correct instant, which is determined by the output voltage of stage II, triggers the delta voltage generator 31 so that the generated voltage variation changes its sign. The frequency of the voltage generated by the generator 31 consequently is determined by the slope of the delta voltage and by the voltages controlled by the trigger arrangement. The slope of the delta voltage can be adjusted in the generator 31 by means of a potentiometer (not shown).

Obviously each pair of tubes can be combined into twin-system tubes.

An advantage of the arrangement shown in FIG. 11 is that the sinusoidal output voltage can be made to start at every voltage value within its range. The starting point can be adjusted by the initial voltage of the delta generator. A further substantial advantage consists in that the arrangement does not exhibit the transient phenomena of conventional oscillators.

What is claimed is:

1. Apparatus for producing a periodic signal having a given frequency and a predetermined waveform, said apparatus comprising a first source of substantial sinusoidal signal having a predetermined frequency greater than said given frequency, a second source of alternating signal having said given frequency, differential amplifier means comprising first and second input means coupled to said first and second sources, respectively, said differential amplifier means further comprising means for comparing said first and second signals, said comparing means comprising means for producing a pulseform signal at instants when the amplitude of one of said signals exceeds the amplitude of the other of said signals, and means coupled to said comparing means for integrating said pulseform signal, and output means coupled to said integrating means for providing said periodic signal.

2. Apparatus for producing a periodic signal having a given frequency and a substantially triangular waveform, said apparatus comprising a first source of substantially sinusoidal signal having a frequency respectively greater than said given frequency, a second source of substantially sinusoidal signal having a frequency equal to said given frequency, differential amplifier means having first and second input means adapted to provide pulse signals proportional to the difference in amplitudes of the respective signals of said first and second sources, first means to couple said first input means to said first source, second means to couple said second input means to said second source, and output means responsive to said pulse signals, said output means comprising an integrating network coupled to said differential amplifier means to integrate said pulse signals and derive said given frequency triangular periodic signal.

3. Apparatus according to claim 2 wherein said integrating network further comprises successively coupled amplifier, limiter and integrating circuits.

4. Apparatus for producing a periodic signal having a given frequency and a substantially sinusoidal waveform, said apparatus comprising, differential amplifier means having first and second input means and output means associated therewith, a first source of substantially sinusoidal signal having a predetermined frequency relatively greater than said given frequency coupled to said first input means of said amplifier, a triangular waveform generator means for providing a triangular waveform signal having a frequency equal to said given frequency, comparison means having respective first and second input means, means for applying the output of said amplifier as a first input to said comparison means, means for applying said triangular waveform signal as a second input to said comparison means, means for deriving from said comparison means a substantially sinusoidal signal of said given frequency, means for coupling said derived sinusoidal signal to said second input means of said differential amplifier means, and output means coupled to said amplifier's second input means to derive said given frequency sinusoidal periodic signal.

5. Apparatus according to claim 4 further comprising means for controlling the phase polarity of said triangular waveform signal, said latter means comprising a phase controlling trigger circuit interposed between the output of said differential amplifier and the input of said triangular waveform generator.

6. Apparatus according to claim 4 wherein said differential amplifier output means comprises an integrating network.

7. Apparatus as claimed in claim 4 wherein said differential amplifier means further comprises first and second differential amplifiers arranged in succession.

8. Apparatus for producing a substantially sinusoidal signal of given frequency comprising a differential amplifier system having first and second input means and output means, said output means including an integrating network, means for applying to said first input means a substantially sinusoidal signal having a frequency greater than said given frequency, comparison means having first and second input means, means for coupling said amplifier output means to said first input means of said comparison means, means for generating a signal having a substantially triangular waveform, means for applying said triangular waveform signal to said second input means of said comparison means, a trigger circuit interposed between the output of said differential amplifier and the input of said triangular waveform generating means, means for deriving from said comparison means a substantially sinusoidal signal of said given frequency, feedback means for applying said derived sinusoidal signal to said second input means of said differential amplifier system, and output means coupled to said amplifier second input means.

9. Apparatus for producing an output signal which varies as a predetermined function of an input signal comprising a first source of periodic alternating voltage, a second source of voltage, differential amplifier means comprising first and second input means coupled to said first and second sources, respectively, and further including means for comparing said first and second voltages thereby to produce a pulseform signal at the instant when the amplitude of one of said voltages exceeds the amplitude of the other of said voltages, means for applying said pulseform signal to an input of said first source of alternating voltage thereby to initiate a new cycle of said alternating voltage, means coupled to said comparing means for integrating said pulseform signal, and means for deriving said output signal from said integrating means.

References Cited by the Examiner

UNITED STATES PATENTS

| | | | |
|---|---|---|---|
| 2,480,201 | 8/1949 | Selove | 250—27 |
| 2,598,491 | 5/1952 | Bergfors | 328—61 |
| 2,662,213 | 12/1953 | Vanderlyn | 250—27 |
| 2,703,203 | 3/1955 | Bishop | 250—27 |
| 2,779,872 | 1/1957 | Patterson | 328—147 X |
| 2,860,241 | 11/1958 | Post | 328—146 X |
| 2,864,000 | 12/1958 | Elson | 328—146 |

FOREIGN PATENTS

| | | |
|---|---|---|
| 155,744 | 5/1951 | Australia. |

DAVID J. GALVIN, *Primary Examiner.*

SAMUEL B. PRITCHARD, GEORGE N. WESTBY, ARTHUR GAUSS, JOHN W. HUCKERT, *Examiners.*